United States Patent [19]
Maggioni

[11] Patent Number: 5,828,779
[45] Date of Patent: Oct. 27, 1998

[54] METHOD FOR CONSTRUCTING A COLOR TABLE IN A COMPUTER UNIT FOR THE CLASSIFICATION OF PICTURE ELEMENTS IN AN IMAGE

[75] Inventor: Christoph Maggioni, Munich, Germany

[73] Assignee: Siemens Aktiengesellschaft, Munich, Germany

[21] Appl. No.: 632,626

[22] Filed: Apr. 15, 1996

[30] Foreign Application Priority Data

May 5, 1995 [DE] Germany ............ 195 16 664.7

[51] Int. Cl.⁶ .................................... G06K 9/00
[52] U.S. Cl. .................. 382/165; 382/164; 382/225
[58] Field of Search ..................... 382/164, 165, 382/173, 191, 224, 225, 228; 395/131; 364/526; 345/199

[56] References Cited

U.S. PATENT DOCUMENTS 5,454,050  9/1995  Nakabayashi et al. ............. 382/165

FOREIGN PATENT DOCUMENTS 0 564 858 A2  10/1993  European Pat. Off. .
36 39 636 A1   5/1988  Germany .
43 39 161 A1   2/1995  Germany .

OTHER PUBLICATIONS

Maschinelles Sehen –Journal –ISBN 5–87207–004–5 –Pia ottcher, Robert Massen, 1990, pp. 121–125.
Color Recognition System for Automation Engineering –Siemens Forsch –Lechner et al 1984, pp. 28–32.
Grundlagen –Elektronik 13/24.6 1988 –Farberkennung mit schneller Sequentieller Klassifikation –Barschdorff et al, pp. 61–66.
Non Immersive Control of Virtual Environments –Christoph Maggioni –Virtual Reality 94 –Stuttgart, Feb. 1994, pp. 1–14.

Primary Examiner—Phuoc Tran
Attorney, Agent, or Firm—Hill & Simpson

[57] ABSTRACT

In a color table in a computer unit for the classification of picture elements in an image, a table is constructed in which an entry is made for each color displayable by the computer unit as to whether the corresponding color corresponds to a selectable, predetermined color, or is not similar to the selectable color. For this purpose, all color values are transformed into a two-dimensional color space. The user marks a region of selectable size that comprises the selectable predetermined color on the image. An average value is calculated over this region leaving color values in the region that diverge greatly from the selectable predetermined color value out of consideration. On the basis of geometric considerations, a check is made for each color value to see whether it is adequately similar to the selectable predetermined color or not. The binary check result is entered into the color table, which contains an entry for each color displayable by the computer unit.

26 Claims, 2 Drawing Sheets

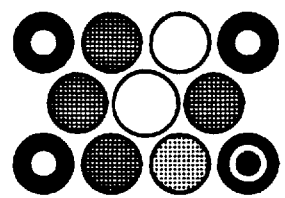
FIG 1
FIG 2
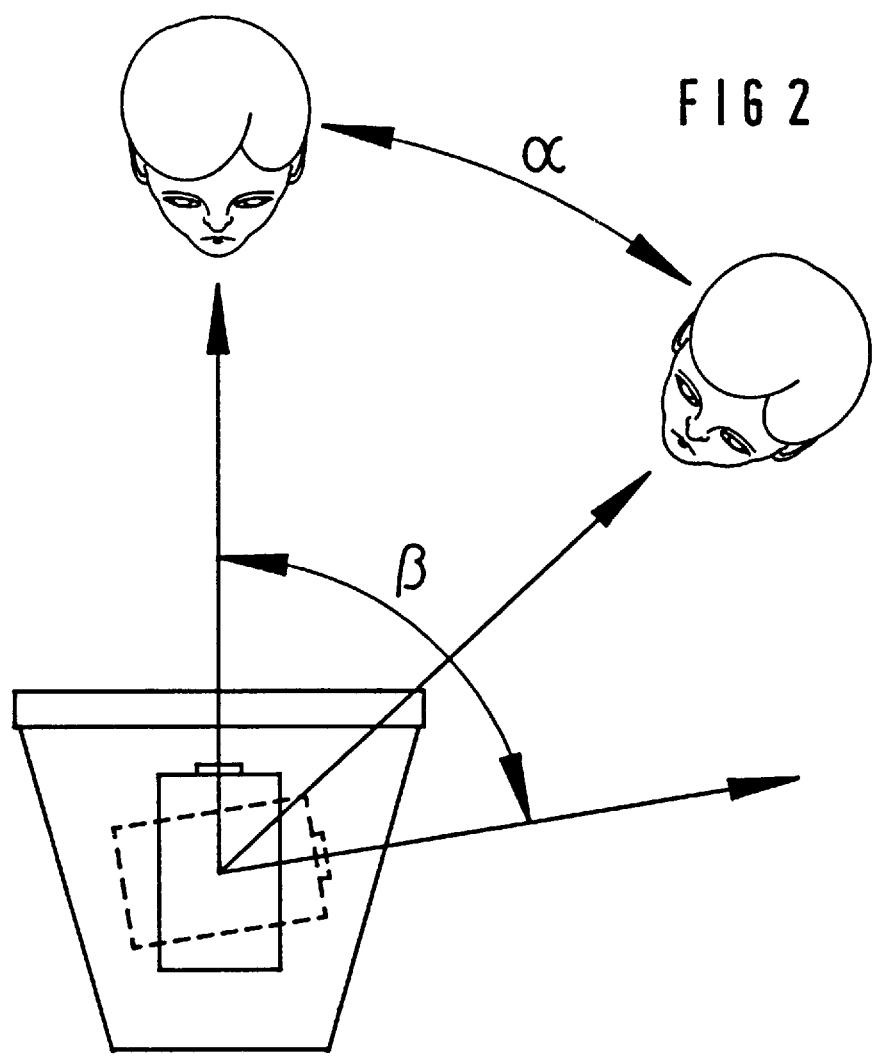

METHOD FOR CONSTRUCTING A COLOR TABLE IN A COMPUTER UNIT FOR THE CLASSIFICATION OF PICTURE ELEMENTS IN AN IMAGE

BACKGROUND OF THE INVENTION

In many areas of image processing, for example in the field of video conferences, it is necessary to recognize subjects very quickly and simply, and to further-process these subjects with optimally little unweighted or redundant information. In the field of video conferences, for example, a subject can be the head of a participant. In other fields of image processing, it can also be advantageous to recognize and further-process other subjects or for example, other body parts. A possible application of individual, recognized subjects in an image is the control of virtual objects on the basis of the movement of body parts.

Color tables or color histograms are often employed in this field. The color tables must comprise a very simple structure corresponding to the further applications.

Various methods are known for constructing a color table in a computer unit (DE 3 639 636 A1; H. Ernst, Maschinelles Sehen, Europa Fachpresse Verlag GmbH, München, pp. 121–125, 1990; ELECTRONIK 13/1988, pp. 61–66; Siemens Forschungs-und Entwicklungs Bericht, Vol. 13, No. 1, pp. 28–32, 1984).

A method is known for the recognition of the spatial position and rotational attitude of subjects marked in a suitable way (PCT/DE 94/00893). The disadvantage of this method is that this method requires a marker that must be applied to the subject to be recognized.

A method for resolving clusters of moving segments is known (EP 0 564 858 A1).

Further, a method is known for tracking movements of a human hand in a time sequence of digital color images (DE 43 39 161 A1). This method, however, comprises the disadvantage that it supplies less precise results compared to the method of the invention and is also more complicated to implement; and thus a longer time is required for the implementation of the method.

SUMMARY OF THE INVENTION

It is an object of the invention to form a color table in a computer unit with reference whereto real-time applications in pattern recognition are possible.

In a method of the invention for constructing a color table in a computer unit for classification of picture elements in an image, color information of all picture elements is transformed into a two-dimensional color space. All colors in the two-dimensional color space displayable by the computer unit are employed as index values of the color table. At least one region having a predetermined color and selectable size is marked. The first average color value is calculated over the at least one region. At least one second average color value is calculated, a selectable percentage of the picture elements in the region with color points being at a greatest distance from the first average color value not being taken into consideration. The region of selectable size is selected around the second average color value in the two-dimensional color space. An arbitrary number is calculated of a color not corresponding to the predetermined color representing negative color points in the two-dimensional color space. A check is carried out for all colors displayable by the computer unit to determine whether the color point representing the color is allocated to the second average color value. The check occurs in such a way that a perpendicular for every color point representing the respective color is drawn onto each straight connecting line of the at least second average color value to the negative color points. The respective color point is allocated to the second average color value when a distance from each perpendicular foot to at least the second average color value is less than to each of the other negative color points corresponding to the respective straight line connection or to a white point, and the color point lies in the region around the second average color value. A binary result of the check is entered into the color table as a binary value.

The advantage of the method of the invention is that the structure of the color table is kept very simple, and applications to be placed on the color table can thus also be more easily realized in real time. The method of the invention is explained in greater detail below.

An advantage of a use of the method of the invention is that a real-time processing is achieved without restrictions by prior markings of target subjects. A very fast and efficient subject recognition and segmenting are possible by employing a color table wherein whether or not the color corresponds to the color of the target subject is respectively contained in binary form for each color displayable by the computer. Real-time applications, which are explained below, are thereby also enabled.

Due to the possibility of further-processing in real time, it is possible to control virtual objects in contact-free fashion only on the basis of body movements. The possibility of contact-free control of virtual objects has considerable advantages compared, for example, to methods that use what is referred to as a data glove for the control of virtual objects (T. G. Zimmermann et al., "A Hand Gesture Interface Device", Proc. ACM CHI+GI Conf. Human Factors in Computing Systems and Graphics Interface, pp. 189–192). The user acceptance of a contact-free control mechanism is higher than given a control mechanism that requires additional activities on the part of the user before and during the use; thus, for example, the data glove must be put on during the use and also disturbs the user in terms of his freedom of motion. Video cameras can also be more easily protected both against contamination as well as against destruction.

Since the user is not hindered, the use of the method of the invention can be very advantageously employed in many areas of social life.

For example, it is possible to intuitively present for the user a three-dimensional presentation of objects, for example products in advertizing or in the field of architecture. By employing the method of the invention, it becomes possible for the viewer to observe three-dimensional virtual objects that are imaged on a picture screen from all directions of view by moving body parts.

This property can also be advantageously applied in many scientific fields. In chemistry, for example, molecules can be three-dimensionally visualized and viewed from arbitrary directions of view. Another important area of employment lies in medicine, wherein it is very advantageous to be able to intuitively view three-dimensional images like those made available, for example, by computer tomography from the greatest variety of viewing directions merely on the basis of body movement. The control of remote cameras, both virtual as well as real cameras, harbors advantages, for example when monitoring buildings or when controlling cameras that are attached to the tail of trucks in order to enable marshaling in reverse. Video games can also be designed more user-intuitive and exciting.

Given employment of the method of the invention in the field of video conferences, the required transmission capacity can be saved since only the information really required for a video conference is transmitted, i.e. the circumscribing rectangle of the head of the party to the conference in this context.

The development of the method of the invention wherein a background image that does not comprise the at least one target subject is additionally recorded at a beginning of the method, and wherein an object is classified as the target subject when a background image additionally does not comprise the object, achieves a more stable classification of the target subject or, respectively, subjects.

A preferred exemplary embodiment of the invention and advantageous applications of the method of the invention are shown in the drawings and are described in greater detail below.

BRIEF DESCRIPTION OF THE DRAWINGS

FIG. 1 is a sketch wherein a pattern that can be used for calibration of the camera is shown;

FIG. 2 is a sketch that shows the geometry of the virtual holography;

DESCRIPTION OF THE PREFERRED EMBODIMENTS

Figure 3:
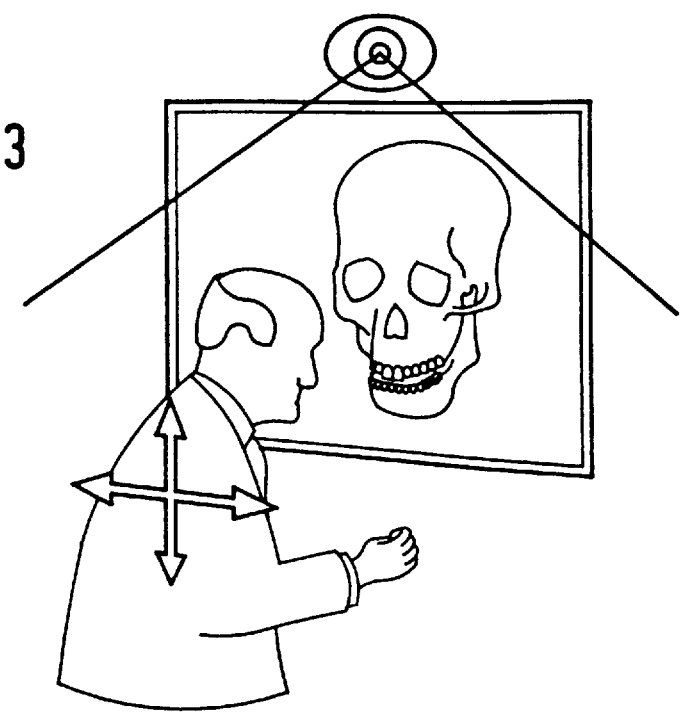
FIG. 3 is a sketch that shows an advantageous use of the method of the invention in the medical field.
Figure 4:
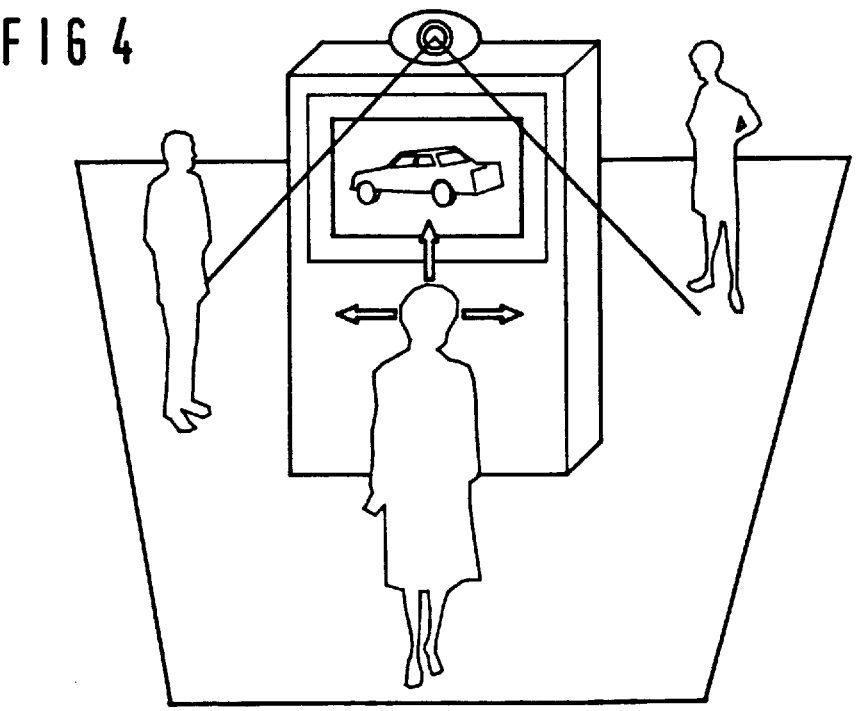
FIG. 4 is a sketch that describes another advantageous use of the method of the invention in the field of three-dimensional product presentation.

In a first step, the system, i.e. the camera recording the target subject and the computer unit for the recognition of the target subjects, must be matched both to the light conditions as well as to the color of the target subject or subjects to be recognized.

FIG. 1 shows a pattern for the calibration of the camera. The image is registered by the camera or cameras and a known algorithm calculates the geometric properties of the camera, for example the camera gain, the shutter speed of the camera, the white balance and the color saturation, by measuring color values of specific patterns as shown, for example, in FIG. 1.

The matching of the system to the skin color of the user can occur, for example, by forming color histograms (R. Schuster et al., Modelbasierte Beschreibung von Farbhistogrammen and Segmentation von Farbbildern", DAGM-Symposium 1993, 1993). A further possibility for the preferred construction of a color table is described below. The procedure described below has a considerable speed advantage compared to known methods for constructing color histograms. A further advantage is comprised in a considerable improvement of the segmentation result.

The color table is produced with the support of the user. The support of the user is comprised therein that the user marks the target subject on an image registered by a camera and in which the target subject or subjects is/are located. This marking can occur, for example, with a mouse click or, given a touch screen, by simply tapping the target subject on the touch screen.

Without limiting the general validity, only one target subject shall be assumed below for further explanation of the method of the invention.

A color table can also be produced in the way described below.

In a first step, what is to be classified as a predetermined color is interactively defined together with the user. For this purpose, the user marks an image region comprising the predetermined color in an image registered by a camera. This can preferably occur in that, for example given classification of skin color, the user himself is registered in the registered image, for example the hand or head of the user. The hand or head of the user on the image is then marked by the user as an image region that comprises the predetermined color. The registered image is stored in a computer unit and is made available for further processing.

Other procedures are also possible here; for example, the color of a garment can also be indicated as a predetermined color since the user marks, for example, an image region in the registered image that comprises the garment having the predetermined color.

The marking can occur in various ways; for example, it can preferably occur by employing a computer mouse, the keyboard or all other possibilities known to a person skilled in the art for marking image areas to be processed in a computer unit.

The size of the marked image area can be freely selected by the user.

The color information of all color from the employed color space displayable by the computer unit—usually the three-dimensional R-G-B (red-green-blue) space—is transformed by a transformation into a two-dimensional color space. No color information whatsoever is lost due to the transformation.

The transformation can occur in various ways. The following transformation equations are preferably provided.

A first transformation has the following structure:

$$a = \frac{R}{R+G+B} \quad (1)$$

$$b = \frac{G}{R+G+B} \quad (2)$$

Where:
R is the part of the color red in the respective color,
G is the part of the color green in the respective color,
B is the part of the color blue in the respective color,
a is first spatial coordinate in the two-dimensional color space, and
b is a second spatial coordinate in the two-dimensional color space.

A second transformation has the following structure:

$$a = \frac{G-R}{R+G+B} \quad (3)$$

$$b = \frac{B \cdot 2 - R - G}{R+G+B} \quad (4)$$

The designations are employed in the same connotation in the second transformation and in a third transformation as in the first transformation. The third transformation has the following structure:

$$a = G\text{-}R \quad (5)$$

$$\frac{B \cdot 2 - R - G}{2} \quad (6)$$

Respectively only one of these transformations is employed in order to transform all colors displayable by the computer into the two-dimensional color space.

Further transformations are familiar to a person skilled in the art and can be utilized without limitation in the method of the invention.

Due to the transformation, a point in the two-dimensional color space is unambiguously allocated to each point in the three-dimensional color space.

A first average color value that represents an average value of all colors occurring in the marked image region is calculated for the image region set forth above and marked by the user. Since a color is represented in a computer unit by a numerical value, the calculation can occur, for example, by forming a sum of all color values of each picture element located in the marked image region and by subsequent division by the number of picture elements located in the marked image region. The result is then the numerical value that represents the first average color value. The first average color value is likewise represented by a point in the two-dimensional color space.

A second average color value is now calculated in the marked image region in the way set forth above, whereby a part of n% of the picture elements situated in the marked image region are left out of consideration in the calculation of the second average color value. The n% part of the picture elements left out of consideration are the picture elements that are at the greatest distance from the first average color value in the two-dimensional color space, i.e. respectively comprise a color that differs most from the first average color value.

This non-consideration of color values serves the purpose of error compensation. This procedure is very advantageous in order, for example, when calculating a second average color value representing the skin color on the basis of a marked region that is represented by the head of the user, to compensate color irregularities such as, for example, the user's eyes that are also in the marked image region.

The size of n, i.e. the particular of how many % of the color values located in the marked image region should be left out of consideration, is dependent both on the subject with reference whereto the second average color value is to be formed, as well as on the required precision of the second average color value and on the available calculating capacity. For this reason, the quantity n must be respectively adapted to the corresponding situation. The size of n can preferably lie in a range of 5–50. The method of the invention is not limited to the second average color value. A plurality of average color values can be formed with the same procedure, using different values for n. A higher number of average color values enhances the quality of the classification that occurs later. Only the second average color value is considered below, which does not represent any limitation.

Subsequently, an arbitrary number of negative color values is selected. What is understood by negative color values in this context are color values that do not correspond to the predetermined color. At least one white point representing the color white is preferably employed as a negative color value in the two-dimensional space. An enhanced number of negative color values improves the classification of all colors described below into a color that belongs to the predetermined color, i.e. is adequately similar, and into a color that is not similar to the predetermined color.

A round, for example circular or elliptical region, is formed both around the second average color value as well as around every negative color point representing the respective negative color value, for example around the white point. These regions are referred to below as an average value region for the second average color value and as negative color regions for the regions around the negative color points.

The regions can comprise an arbitrary size; i.e., it is also possible that regions overlap, or that one region completely surrounds another region.

A classification as to whether the respective color point is classified as adequately similar to the predetermined color point that represents the second average color value or whether the respective color point is classified as not similar to the predetermined color point is implemented for each color value that can be displayed by the computer, and is transformed into the two-dimensional color space that is represented by the respective color point.

The classification is implemented in such a way that a perpendicular for each color point displayable by the computer unit is drawn onto each straight connecting line between the predetermined color point representing the second average color value and each negative color point. As a result thereof, exactly as many feet of perpendiculars as negative color points arise—what is thereby meant is the intersection of the respective perpendicular with the corresponding straight connecting line.

A first distance from the foot of the perpendicular to the predetermined color point representing the second average color value is calculated for each foot of a perpendicular. The first distance is compared to a second distance that represents the distance of the corresponding perpendicular foot from the respective negative color point.

A color point is classified as being adequately similar to the color point representing the second average color value when the first distance is shorter than the second distance for each perpendicular foot of the color point and when each perpendicular foot lies in the average value region.

The binary result is stored in the color table whereby, after the conclusion of the method set forth above, contains a binary entry for every color point in the two-dimensional color space, i.e. for each color displayable by the computer unit.

The color table contains the binary information for each color value that respectively unambiguously addresses an entry in the color table as to whether the color point was classified as similar to the predetermined color or not.

The construction of the color table according to the above-described method enables a real-time realization of various applications of the method of the invention since only one binary value needs to be read out for a color value so that it is known whether the color value was classified as adequately similar to the predetermined color.

After the color table has been formed, an arbitrary, known algorithm for edge tracking is implemented for the entire image in an advantageous application of the method of the invention, for example an edge tracking method described in T. Pavlidis, "Algorithms for Graphics and Image Processing", Springer Verlag, 1982. Subjects and their subject edges whose color was classified, for example, as similar to the predetermined color according to the color table are identified with the assistance of this method.

After the method has been applied to the image, a plurality of subjects that possibly come into consideration as a target subject are located on the image.

The target subject is now identified from this plurality of subjects on the basis of known characteristics of the target subject. For example, the characteristics can be represented by the size of the target subject or the shape of the target subject.

For example, the geometric moment of the target subject can also be calculated dependent on the provided application of the method of the invention, for example according to the method described in Bing-Cheng Li and Jun Shen, "Fast Computation of Moment Invariants", Pattern Recognition, Vol. 24, No. 8, pages 807–813, 1991.

The identified contours and the data about the geometric moments can also be subjected to a few method steps for image enhancement that, for example, are described in C. H. Maggioni, "Non-Immersive Control of Virtual Environments", Proc. Virtual Reality 1994—Anwendungen und Trends, Stuttgart, Feb. 1994, 1994.

Subsequently, a rectangle circumscribing the target subject is calculated for the target subject. All subjects that comprise the predetermined color and that are located outside the circumscribing rectangle are classified as belonging to the background image.

The method can be improved in that the camera registers a background image at the beginning of the method, this camera recording the same scene as later when the target subject is present in the scene. The target subject is not present in the background image.

In this case, the method is improved in such a way that, in the classification of a subject to the target subject, the subject is only classified as a target subject when the subject is also not located in the background image.

When the target subject is represented by a head, the result of the method is, for example, the position of the head within the image.

When the target subject is represented by a hand, the result of the method of the invention is, for example, the position of the hand within the image, the distance of the hand from the camera that records the image, or the position of individual fingers of the hand which, for example, represent specific hand gestures.

The required computing requirements are substantially reduced compared to known methods due to the further-processing of only the circumscribing rectangle for which, for example, a motion estimate is subsequently Implemented in order to identify the position of the circumscribing rectangle, and thus of the target subject in a following frame or image.

The method can be very advantageously utilized in a number of areas of social life since the applications set forth below can be realized in real time with the method of the invention, which was previously not possible.

A very advantageous application of the method is comprised in the three-dimensional presentation of products or, for example, in applied fields of architecture, particularly in the presentation of virtual spaces or rooms. In general, this method can be employed in many areas of virtual reality. In these applied fields, the three-dimensional product or, for example, the view of a virtual space or room or the view of a virtual house displayed on a monitor, can be viewed "from all sides" merely by modifying the position of a body part, for example the head or the hand of a viewer.

Given employment of the method for these purposes, a camera is installed in the proximity of the monitor on which the product is presented. The camera records, for example, the head or the hand of the viewer and classifies the head or the hand or both as a target subject. The values supplied by the method of the invention, i.e., for example, the head position of the viewer, are employed as an actuating variable for a virtual camera that records the virtual object display ed on the monitor. By varying the head position or by moving the hand, the three-dimensional perspective of the displayed subject is varied in that the body movement is converted into actuating variables. Qualitative improvement can be achieved by employing filters, for example low-pass filters and/or hysteresis filters, for filtering the position parameters of for example, the head or the hand. It is also advantageous to employ directionally dependent hysteresis filters. What is to be understood by a directionally dependent hysteresis filter is a function that subjects chronologically successive, selectable coordinates to a transformation. A coordinate in the method of the invention is a fixed, selectable point within the target subject. Given employment of a hand as a target subject, for example, such a coordinate is represented by the center of gravity of the hand or by a point of a finger.

The transformation for a coordinate $x_i$ at time I is preferably implemented on the basis of chronologically preceding coordinate values $x_{i-1}$ and $x_{i-2}$ at times I-1 and I-2 on the basis of the following transformation equations:

if $sgn(x_{i-2}-x_{i-1})=sgn(x_{i-1}-x_i)$ then $t=t_1$ otherwise $t=t_2$ if $|x_{i-1}-x_i|<t$ then $x_i=x_{i-1}$ otherwise $x'_i=x_i$.

The values $t_1$ and t2 thereby indicate hysteresis thresholds that the user can freely select. The value $t_1$ thereby lies in the range $[0;t_2]$.

The value $x'_i$ represents a transformed coordinate, i.e. the transformation result of $x_i$.

The expansion of the directionally dependent hysteresis filter to higher dimensions is familiar to a person having ordinary skill in the art by replacing the sgn function, i.e. the operational sign comparison, by a calculation of the change in motion direction of the multi-dimensional representation of the coordinate $x_i$.

This is achieved in that, for example, a modification of the head position by an angle α, applied to a plurality of successive images or frames, i.e. an image sequence, is recognized by the method of the invention and this angle scalarly changes the position of the camera that records the virtual object displayed on the monitor by an angle β (see FIG. 2). The modification of the position of the virtual camera is known in and of itself and is a technique that is often employed, for example, in three-dimensional CAD applications.

A contact-free and user-intuitive control of the three-dimensional views of an object, however, now becomes possible with the method of the invention.

The method of the invention can similarly be advantageously utilized in various scientific fields.

In the medical field, it is provided that three-dimensional image data, for example images of computer tomography, can be viewed from a great variety of perspectives merely by moving the head or the hand of a viewer that is recorded by a camera that is mounted in the proximity, for example to the side of the monitor or above the monitor that displays the tomography image. An attending physician can thus select the views of the tomography image of interest to him in a very simple way and in very detailed fashion.

In chemistry, three-dimensional molecule structures can be investigated in detail and in simply fashion in a corresponding way.

The employment of the method of the invention can also be advantageously utilized in the field of traffic, for example in the control of real cameras that are attached to the tail of a truck, in order to make it possible for the driver to see the field of vision that would be covered given normal travel in reverse. The control of the tailgate camera by the driver only on the basis of body movement then becomes possible given recording and tracking of, for example, the head of the truck driver by a camera attached in the cab, for example at the upper edge of the middle of the windshield.

The control of remote cameras, for example when monitoring buildings, is also generally possible in a corresponding way.

The method of the invention in conformity with the above-described procedures can also be advantageously utilized in computer games that comprise the control of three-dimensional objects.

The method can likewise be very advantageously used in the field of video conferences. In standard methods, the user is very restricted in terms of his freedom of movement since a wide-angle camera is not used for recording the scene, so that optimally little unnecessary information has to be transmitted. Too much transmission capacity would be required, however, if a wide-angle camera were employed. The method of the invention makes it possible to transmit only the content of the circumscribing rectangle of, for example, the head of a party to the communication.

By employing the circumscribing rectangle, only the head of the party to the communication is transmitted and the unnecessary image background is left out. As a result of the motion estimate that is provided for the circumscribing rectangle, it is possible to recognize head movement of the party to the communication and, for example, to either adapt the circumscribing rectangle, select the size of the circumscribing rectangle somewhat larger so that the head is not cut off within the transmitted image or, on the other hand, to mechanically readjust the camera that records the scene, adapted to the head movements, in a suitable way, so that it is always only the head of the party to the communication that need be recorded and transmitted. The user is thereby no longer restricted in his freedom of movement to the same extent as previously in video conferences.

It is also provided that, before the beginning of a video conference or during a video conference as well, the parties to the communication decide whether, for example, the circumscribing rectangle and, thus, the image of the head of the party to the communication is to be transmitted or whether the background image should also be transmitted. The size of the window can also be individually defined and, thus, can be "negotiated" by the parties to the communication or the computer units of the video conferencing units employed before the beginning of the video conference or during the video conference.

Although various minor changes and modifications might be proposed by those skilled in the art, it will be understood that my wish is to include within the claims of the patent warranted hereon all such changes and modifications as reasonably come within my contribution to the art.

I claim as my invention:

1. A method for constructing a color table in a computer unit for classification of picture elements in an image, comprising the steps of:

transforming the color information of all picture elements into a two-dimensional color space;

employing all colors in the two-dimensional color space displayable by the computer unit as index values of the color table;

marking at least one region having a predetermined color and selectable size;

calculating a first average color value over the at least one region;

calculating at least one second average color value, a selectable percentage of the picture elements in the region whose color points are at a greatest distance from the first average color value not being taken into consideration;

selecting a region of selectable size around the second average color value in the two-dimensional color space;

calculating an arbitrary number of a color not corresponding to the predetermined color representing negative color points in the two-dimensional color space;

carrying out a check for all colors displayable by the computer unit to determine whether the color point representing the color is allocated to the second average color value, said check occurring in such a way that a perpendicular for every color point representing the respective color is drawn onto each straight connecting line of the at least second average color value to the negative color points, and the respective color point is allocated to the second average color value when a distance from each perpendicular foot to at least the second average color value is less than to each of the other negative color points corresponding to the respective straight-line connection or to a white point, and the color point lies in the region around the second average color value; and entering a binary result of the check into the color table as a binary value.

2. The method according to claim 1 wherein a negative color point is represented by a white point representing the color white.

3. The method according to claim 1 wherein the method is employed for computer-assisted recognition of at least one selectable target subject of an image upon employment of characteristics of the target subject, and wherein upon employment of the color table, objects are formed that comprise prescribable colors that are determined in the color table;

at least one target subject is classified from the objects upon employment of characteristics of the at least one target subject; and a spatial position is determined for the at least one target subject.

4. The method according to claim 3 wherein a circumscribing rectangle is constructed around the at least one target subject.

5. The method according to claim 3 wherein a background image that does not comprise the at least one target subject is additionally recorded at the beginning of the method; and an object is classified as the target subject when a background image additionally does not comprise the object.

6. The method according to claim 3 wherein a motion estimate is implemented for each circumscribing rectangle that is formed.

7. The method according to claim 3 wherein a directionally dependent hysteresis filter is employed.

8. The method according to claim 3 wherein the target subject is formed by a human head; and the prescribable color is formed by the color of human skin.

9. The method according to claim 3 wherein the target subject is formed by a human hand; and the prescribable color is formed by the color of human skin.

10. The method according to claim 3 wherein the method is employed for presentation of a three-dimensional object, and wherein position parameters of the target subjects are converted into actuating variables of a virtual camera; and a view onto the displayed three-dimensional object can be arbitrarily varied by the actuating variables.

11. The method according to claim 3 wherein the method is employed in medicine wherein position parameters of the target subject are converted into actuating variables for modifying a view of a three-dimensional image.

12. The method according to claim 3 wherein the method is employed for the control of a real camera, and wherein position parameters of the target subjects are converted into actuating variables of at least one real camera; and the at least one real camera is scalably moved by the actuating variables.

13. The method according to claim 3 wherein the method is employed for video conferences, and wherein a size of a circumcising rectangle is variable.

14. A method for constructing a color table in a computer unit for classification of picture elements in an image, comprising the steps of:

transforming all color values from a three-dimensional color space into a two-dimensional color space;

marking a region of selectable size that comprises a selectable predetermined color on the image;

calculating an average value over the region leaving color values in the region which diverge more than a prescribed amount from the selectable predetermined color value out of consideration;

based on a geometric analysis , making a check for each color value to see whether it is similar based on a defined criteria to the selectable color or not; and entering a result of the check into a color table which contains an entry for each color displayable by the computer unit.

15. The method according to claim 14 wherein a negative color point is represented by a white point representing the color white.

16. The method according to claim 14 wherein the method is employed for computer-assisted recognition of at least one selectable target subject of an image upon employment of characteristics of the target subject, and wherein upon employment of the color table, objects are formed that comprise prescribable colors that are determined in the color table;

at least one target subject is classified from the objects upon employment of characteristics of the at least one target subject; and a spatial position is determined for the at least one target subject.

17. The method according to claim 16 wherein a circumscribing rectangle is constructed around the at least one target subject.

18. The method according to claim 16 wherein a background image that does not comprise the at least one target subject is additionally recorded at the beginning of the method; and an object is classified as the target subject when a background image additionally does not comprise the object.

19. The method according to claim 16 wherein a motion estimate is implemented for each circumscribing rectangle that is formed.

20. The method according to claim 16 wherein a directionally dependent hysteresis filter is employed.

21. The method according to claim 16 wherein the target subject is formed by a human head; and the prescribable color is formed by the color of human skin.

22. The method according to claim 16 wherein the target subject is formed by a human hand; and the prescribable color is formed by the color of human skin.

23. The method according to claim 16 wherein the method is employed for presentation of a three-dimensional object, and wherein position parameters of the target subjects are converted into actuating variables of a virtual camera; and a view onto the displayed three-dimensional object can be arbitrarily varied by the actuating variables.

24. The method according to claim 16 wherein the method is employed in medicine wherein position parameters of the target subject are converted into actuating variables for modifying a view of a three-dimensional image.

25. The method according to claim 16 wherein the method is employed for the control of a real camera, and wherein position parameters of the target subjects are converted into actuating variables of at least one real camera; and the at least one real camera is scalably moved by the actuating variables.

26. The method according to claim 16 wherein the method is employed for video conferences, and wherein a size of a circumcising rectangle is variable.

* * * * *